United States Patent Office 3,716,374
Patented Feb. 13, 1973

3,716,374
METHOD OF INCREASING SOLUBILITY OF FOOD ACIDULENTS
Esra Pitchon, Flushing, N.Y., assignor to General Foods Corporation, White Plains, N.Y.
No Drawing. Continuation-in-part of abandoned application Ser. No. 764,633, Oct. 2, 1968. This application July 12, 1971, Ser. No. 161,966
Int. Cl. A23l 1/00
U.S. Cl. 99—78   9 Claims

ABSTRACT OF THE DISCLOSURE

Fumaric or adipic acid is partially coated with an aqueous mixture of larch gum and either propylene glycol or glycerol. The coated acid is impact milled to a particle size less than 25 microns and mixed with a hydroxycarboxylic acid such as citric acid. The mixture which can include granular sucrose is impact milled to form aggregates each having a particle size less than 25 microns and a moisture content of from about 1% to about 5%.

CROSS-REFERENCE TO RELATED APPLICATIONS

This application is a continuation-in-part of Ser. No. 764,633 filed Oct. 2, 1968 for cold water solubility acid compositions and now abandoned.

BACKGROUND OF THE INVENTION

Field of the invention

This invention relates to cold water soluble acid compositions, specifically fumaric acid and/or adipic acid compositions, and to fruit flavored beverage mixes including such compositions. In particular, the invention is directed to a method for increasing the cold water solubility rate of these acidulents. The disclosure contained in this specification, although described principally in terms of fumaric acid is equally applicable to adipic acid and is to be construed to apply to both acids.

The prior art has recognized the advantage of substituting edible acids, such as fumaric and adipic acid as a replacement for the conventional more expensive citric acid normally used in beverages. In addition to being less costly, fumaric acid is less hygroscopic than citric acid and finds wide application in powdered food mixes. Because of their reduced tendency to absorb moisture, dry mixes employing fumaric acid as the acidulent remain in a desirable free-flowing condition even after prolonged periods of storage.

Fumaric acid would undoubtedly find wider application in the food industry if it were not for one inadequacy—it does not have a sufficiently rapid solubility rate in cold water to be considered acceptable for use in dry beverage mixes which, according to present commercial standards, are to completely dissolve in the required amount of cold water (40° F.) within one minute, attended with little to moderate stirring.

The use of fumaric acid in dry beverage mixes intended for dissolvability in cold water has been made feasible in the past by certain improvements in the cold water solubility rate of this acidulent. Reitman et al. (U.S. Pat. 3,370,956) disclose increasing the solubility rate of fumaric acid of a particle size of less than 20 microns by co-drying the acids from a mixed solution of fumaric and citric acids in combination with a carbohydrate and a surfactant. Prior to Reitman, Raffensperger improved the solubility of fumaric acid by coating the acidulent with a mixture of a partial long chain fatty acid ester of a polyoxyethylene derivative of a hexitol anhydride derived from sorbitol and propylene glycol (U.S. Pat. 3,009,810) and a mixture of a polyethylene glycol fatty acid ester and propylene glycol (U.S. Pat. 3,152,909). Van Ness et al. (U.S. Pat. 3,181,953) disclose the use of di-octyl-sodium-sulfosuccinate as a surfactant for enhancing the cold water solubility rate of fumaric acid and more recently, Dame, U.S. Pat. 3,580,726, discloses agglomerating the acidulent with the aid of propylene glycol.

Although these and perhaps other techniques have been disclosed for improving the cold water solubility rate of fumaric acid, the use of these methods appears, in most instances, to be deficient in that the so treated fumaric acid, when admixed with other pulverant ingredients in a dry beverage food mix, has a strong tendency to lose its enhanced cold water solubility capability and, upon storage, reverts to a material which is difficult to dissolve. This is especially the case when a portion, or all, of the pulverant ingredients in the beverage mix is hygroscopic in nature. It is believed that the reversion of the fumaric acid particles to the condition of being difficult to dissolve in cold water is brought about during storage through the migration of the surfactant from the surfaces of the acidulant crystals to the more moist hygroscopic ingredients in the beverage mix. This results in the finely ground fumaric acid particles being depleted of substantially all surfactant, resulting in a material which does not wet very well and, therefore, does not dissolve rapidly. Thus, after prolonged storage, when the fumaric acid-containing beverage mix is stirred in cold water, the fine acidulent particles float on the surface because of their poor wettability. Experience has shown that it can take as long as 24 hours to dissolve these particles in water at 40° F.

Although considerable research has been undertaken to determine methods of preventing migration of the surfactant in order to achieve good dispersion of fumaric acid in cold water, these efforts appear to have been only partially successful and, until the present invention, the full potential of utilizing fumaric acid as an effective food acidulent in dry beverage mixes intended for rapid dissolution in cold water after prolonged storage has not been fully realized.

Consequently, there has existed a need for a method of imparting to fumaric acid the desired degree of rapid solubility in cold water, and, more importantly, a method which asures retention by the fumaric acid of its enhanced cold water solubility rate after prolonged storage as an ingredient in a commercially packaged dry beverage mix.

SUMMARY OF THE INVENTION

Accordingly, it is an object of this invention to provide a method of increasing the solubility rate of fumaric acid in cold water.

It is another object of this invention to provide a method of stabilizing fumaric acid with enhanced cold water solubility rate to the extent it can be used as an ingredient, admixed with pulverant, hygroscopic ingredients in a packaged dry beverage mix and be stored under commercial marketing conditions for extended periods without losing its improved cold water solubility distinction.

It is a feature of this invention that the additives employed to improve the cold water solubility rate of the fumaric acid crystals do not detract from the intended utility of the acidulent in the dry beverage mix to provide the desirable degree of tartness to the constituted beverage and additionally, the additives augment the smooth mouth-feel of the constituted beverage.

Briefly, the above and additional objects and features of the invention are accomplished by forming small aggregates or clusters composed of fumaric acid (or adipic acid) adhered to an edible, readily water soluble hydroxycarboxylic acid, such as citric acid, wherein the moisture content of the fumaric acid particles of the aggregate or agglomerate is maintained throughout storage in the presence of hygroscopic materials from about 1% to about 5%.

The formation of the fumaric acid-citric acid aggregates is brought about according to the method of the invention by partially coating the fumaric acid with a humectant-type surfactant in combination with an aqueous solution of larch gum, finely grinding the partially coated acidulent, blending the surfactant wetted fumaric acid with citric acid partciles to form aggregates or agglomerates and then regrinding the aggregates so formed to the proper overall particle size for excellent dispersibility and solubility in cold water.

The gist of the invention resides in the unexpected discovery that an agglomerate or cluster comprised of fumaric acid particles and readily soluble hydroxycarboxylic acid particles adhered or bonded together at their surfaces with a humectant-type surfactant plus larch gum will retain its excellent cold water solubility over prolonged storage when admixed and packaged with pulverant hygroscopic ingredients, such as sucrose, in a beverage mix formulation, provided the fumaric acid particles in the cluster combination have a moisture content of from about 1% to about 5% at the time the so-formed aggregates are admixed and packaged with the other ingredients of the beverage mix.

In essence, it is the combination of the mixed acid aggregate small particle size, the humectant-type surfactant, in combination with larch gum to maintain adequate adherence of the acid particles to each other and to provide a moisture content of about 1% to about 5%, which forms the basis of the invention leading to the improved and successful process for enhancing the cold water solubility of fumaric and adipic acids and for making it possible for the acidulent to retain this cold water solubility. While not intended to be bound by theory, it is hypothesized that the readily soluble hydroxycarboxylic acid particles, in surface contact with the fumaric acid particles, cooperate with the humectant to endow the fumaric acid particles with a surface moisture content within the desired range of 1–5% when in the presence of other hygroscopic materials. For this purpose, it is essential that the hydroxycarboxylic acid particles (for example, citric acid particles) be in contact with the surface of the fumaric acid—that is, the particles of combined acids are heterogeneous aggregates of individual acid particles adhered together with the aid of the larch gum at their surfaces and are not homogenous particles obtained as by co-drying from a mixed solution of the acidulents.

Although the addition of the aqueous mixture of propylene glycol and/or glycerol with larch gum, without the subsequent addition of the hydroxycarboxylic acid, does effect an improvement in the cold water solubility of the fumaric acid, it is necessary, in most instances, that the so coated fumaric acid be agglomerated to the other ingredients, principally the sucrose, comprising the fruit-flavored beverage mix in order for the coated fumaric acid to retain the prerequisite cold water solubility rate after prolonged storage.

This agglomeration procedure has, to date, involved wetting the particles with steam followed by heat fusing the adhered particles incident to drying them.

In contrast to the above relatively expensive method of agglomerating the coated fumaric acid to sucrose, it has been determined that the citric acid crystals (or other hydroxycarboxylic acid crystals) and the coated fumaric acid crystals can be readily aggregated to form strong agglomerates by impacting the acidulents together in an impact-type mill such as a Schutz-O'Neill mill or equivalent. Additionally, it has also been discovered that strong agglomerates of fumaric acid/citric acid/sucrose can be formed by the impaction method provided the fumaric acid, citric acid and sucrose are subdivided to the proper degree and the fumaric acid is, prior to being agglomerated, partially coated with a propylene glycol and larch gum combination. These effective, but relatively less expensive methods of agglomeration, lend further advantages and incentives to the invention which will become evident from the following description of the preferred embodiment.

DESCRIPTION OF THE PREFERRED EMBODIMENTS

The food acidulents (fumaric and adipic acids) used as starting materials according to the present invention are of commercially available food grade quality having non-uniform size particles up to about No. 60 U.S. Standard Sieve size.

Commercially available edible acids which are difficulty soluble, such as fumaric and adipic acids, have non-uniformly sized particles ranging from about 25 to 250 microns. In order to enhance the cold water solubility characteristics of these acids, they must be reduced to a maximum particle size of about 25 microns and, preferably, less than 20 microns. Particle sizes of 5–15 microns are suitable although ultra-fine particle sizes of less than 5 microns will further enhance solubility of the acid if coated properly to prevent agglomeration. However, the ultra-fine size of the acid particles is not necessary for most applications.

The acid, in its commercially available coarse size (25 to 250 microns) can be reduced to a fine particle size (below 25 microns) in the presence of either the water and propylene glycol, glycerol, or mixtures thereof, to achieve the partial coating required. Alternatively, the acid, after fine-grinding, can be sprayed with a dilute water solution of the propylene glycol or glycerol until the partial coating has been attained.

The edible and readily soluble hydroxycarboxylic acid which is to be agglomerated with the fumaric acid, is, preferably citric acid. Other hydroxycarboxylic acids having 2 to 12 carbons or, their metal salts, can be employed for purposes of the invention and such easily soluble acids as malic, tartaric, lactic, or other equivalents can be employed quite successfully but with perhaps slightly less effectiveness than citric acid for retaining cold water solubility of fumaric acid.

It has been established that an amount of hydroxycarboxylic acid ranging from about 1% to about 5% by weight of the fumaric acid is sufficient to impart the prerequisite solubility rate in cold water (40° F.) to the fumaric acid/hydroxycarboxylic acid aggregates when the aggregates are formed by the method of the invention. The preferable amount of hydroxycarboxylic acid to be agglomerated to the fumaric acid is 3–4%, particularly in the case of citric acid.

The humectant-type surfactant which is most effective is propylene glycol with glycerol acting as an alternate of substantially equal effectiveness. Either of these polyhydric alcohols are applied as a partial coating to the fumaric acid crystals in the form of a concentrated aqueous solution. Preferably, 0.5 to 5% by weight of the fumaric acid of edible polyhydric alcohol or mixture thereof in the form of a 40% to 50% aqueous solution is plated or smeared onto the surfaces of the fumaric acid crystals.

Although many water soluble, water dispersible and water swellable gums were tried as candidates to impart adequate adherence of the fumaric acid and hydroxycarboxylic acid in forming aggregates by point to point contact of the substantially dry acid crystals, it has surprisingly been found that larch gum greatly exceeds all other gums in effectiveness for this purpose. As with the polyhydric alcohol, the level of larch gum applied to the surfaces of the fumaric acid crystals also ranges from about 0.5% to about 5% based on the weight of the fumaric acid. In practice, the commercially available granular fumaric acid is finely divided by grinding or pulverization in an impact or attrition mill. By finely divided fumaric acid is meant material having 100% particle-size at or below 25 microns. This degree of pulverization can be accomplished with standard food pulverizing equipment such as a Schutz-O'Neill impact mill, and is considered to be about as fine a particle size as can be efficiently obtained without resorting to expensive specialized mills. The point of the matter being, the finer the fumaric acid crystals, the greater the proportion of surface area for contact with the humectant-type surfactant and larch gum; nevertheless, 25 microns has been shown to be adequate for purposes of the invention and this degree of grinding keeps the processing operation within reasonable economical bounds. Preferably, the fumaric acid is sub-divided to a particle size of 25 microns after it has been plated with the humectant-type surfactant and the larch gum. The moist pulverization of the fumaric acid enables the humectant-type surfactant, preferably propylene glycol, and the larch gum to come in intimate contact with the surface of the pulverized acidulent crystals and be impregnated thereon.

The finely ground acidulent crystals which are surface impregnated with surfactant and larch gum, are then blended with similar sized crystals of the hydroxycarboxylic acid. Preferably, this blending should take the form of a smearing action in order to bring the crystals in point to point contact to effectively form small clusters or aggregates of the hydroxycarboxylic acid (preferably citric acid crystals) with the fumaric acid crystals. Adhesion of the crystals is enhanced by the presence of the larch gum on the surfaces of the fumaric acid crystals. The aggregates or agglomerates of fumaric acid and citric acid so formed are then sub-divided to a particle size of 25 microns or less. It is essential to the success of the method of the invention that throughout the various steps so described, the moisture content of the acidulent and other ingredients is maintained such that substantially dry materials are being blended. In view of the fact that some water will be dissipated due to the heat of the grinding operations, a water balance is maintained so that the final product has a moisture content ranging from about 1% to about 5% by weight of the fumaric acid crystals comprising the aggregates.

When the fumaric acid is to be employed in a naturally sweetened (sucrose) dry beverage mix, both the sucrose and the hydroxycarboxylic acid can be blended with the coated fumaric acid with a smearing or impaction action to bring about point to point contact for the formation of clusters or aggregates of fumaric acid, hydroxycarboxylic acid, and sucrose. The sucrose is added in amounts ranging from about 1 to about 1.5 parts by weight of sucrose to 1 part acidulent. These aggregates are then, as with the fumaric acid/citric acid aggregates, subdivided to a particle size of 25 microns or less.

The above-described procedure, equally applicable to adipic acid, produces a food acidulent composition which has an excellent cold water solubility and which retains those attributes when used as an ingredient admixed with other pulverized material comprising a dry beverage mix which is stored over extended periods of time.

This invention will now be more fully described by reference to the following illustrative examples of a method of preparing fumaric acid-citric acid aggregates with sustained capability of rapid solubility in cold water and the dry mixed beverage in which the agglomerated acidulent composition is incorpoarted as an essential ingredient. Unless otherwise state, all percentages are expressed on a weight basis.

EXAMPLE I

One hundred pounds of commercially available food grade granular fumaric acid were placed in a ribbon-type blender and plated with a solution of 1.1 pounds of larch gum and 2.1 pounds of propylene glycol in 1.8 pounds of water. After blending the coated acidulent for five minutes, it was transferred to a Schutz-O'Neill impaction mill and subdivided to smaller than 25 micron particle size.

The coated and ground fumaric acid crystals were then mixed with three pounds of dry, granular citric acid and the mixture was reground in the Schutz-O'Neill impaction mill to form clusters having a particle size less than 25 microns.

EXAMPLE II

The solubility performance of the combined acid aggregates or clusters upon prolonged storage was determined as follows: about 39 lbs. of the combined acid aggregates were mixed with 58 lbs. of finely ground sugar and 2 lbs. of suitable flavor and color. This material was tumbled in a V blender with intensifier bar for 3 minutes. The product was packaged in foil envelopes and had excellent solubility rate after storage for 6 months at 100° F./35% relative humidity and 90° F./85% relative humidity.

EXAMPLE III

One pound of commercially available food grade fumaric acid was plated as in Example I with an aqueous solution of 0.011 pound of larch gum and 0.021 pound of propylene glycol in 0.018 pound of water.

The plated acidulent was then finely ground (less than 25 microns) in a Schutz-O'Neill impact mill. One and one-half pounds of granular sucrose and 0.03 pound of granular citric acid well admixed with the finely ground plated fumaric acid and the mixture impact ground in a Raymond impact mill to form small clusters of fumaric acid/citric acid/sucrose having a particle size less than 25 microns.

EXAMPLE IV

The aggregated product of Example III was determined to have excellent cold water solubility. The material also performed satisfactorily with respect to cold water solubility when admixed with the flavor and coloring ingredients in a typical dry beverage mix formula when added to cold water.

What is claimed is:

1. In the method of preparing a cold water soluble food acidulent selected from the group consisting of fumaric and adipic acid, the improvement which consists essentially of:
   (a) partially coating the acidulent with an aqueous mixture of larch gum and a polyhydric alcohol selected from the group consisting of propylene glycol, glycerol, and mixtures thereof;
   (b) impact milling the partially coated acidulent to a particle size less than 25 microns;
   (c) admixing the milled, partially coated acidulent with a hydroxycarboxylic acid having 2–12 carbons; and
   (d) impact milling the mixture to form aggregates each having a particle size less than 25 microns, and a moisture content by weight of the acidulent, ranging from about 1% to about 5%, whereby said aggregates dissolve in 40° F. water in less than one minute.

2. The method of claim 1 wherein the acidulent selected from the group consisting of fumaric and adipic acid is partially coated with an aqueous mixture containing, by weight of the acidulent, about 0.5% to about 5% larch gum, about 1% to about 5% polyhydric alcohol and about 1% to about 5% water.

3. The method of claim 1 wherein the partially coated and milled acidulent selected from the group consisting of fumaric and adipic acid is admixed with about 1% to about 5% hydroxycarboxylic acid having 2–12 carbons.

4. The method of claim 3 wherein the hydroxycarboxylic acid is citric acid.

5. In the method of preparing a cold water soluble food acidulent selected from the group consisting of fumaric and adipic acid, the improvement which consists essentially of:
(a) partially coating the acidulent with an aqueous mixture of larch gum and a polyhydric alcohol selected from the group consisting of propylene glycol, glycerol, and mixtures thereof;
(b) impact milling the partially coated acidulent to a particle size less than 25 microns;
(c) admixing the milled, partially coated acidulent with a hydroxycarboxylic acid having 2–12 carbons and granular sucrose;
(d) impact milling the mixture to form aggregates of acidulent, hydroxycarboxylic acid and sucrose; said aggregates having a particle size less than 25 microns and a moisture content, by weight of the acidulent, of about 1% to about 5%, whereby said aggregates dissolve in 40° F. water in less than one minute.

6. The method of claim 5 wherein the acidulent selected from the group consisting of fumaric and adipic acid is partially coated with an aqueous mixture containing, by weight of the acidulent, about 0.5% to about 5% larch gum, about 1% to about 5% polyhydric alcohol and about 1% to about 5% water.

7. The method of claim 5 wherein the partially coated and milled acidulent selected from the group consisting of fumaric and adipic acid is admixed with about 1% to about 5% hydroxycarboxylic acid having 2–12 carbons.

8. The method of claim 7 wherein the hydroxycarboxylic acid is citric acid.

9. The method of claim 5 wherein granular sucrose is admixed with the milled partially coated acidulent in an amount ranging from about 1 to about 1.5 parts by weight of sucrose to 1 part acidulent.

References Cited

UNITED STATES PATENTS

| | | | |
|---|---|---|---|
| 3,580,726 | 5/1971 | Dame | 99—78 |
| 3,506,453 | 4/1970 | McCarron | 99—78 |
| 3,370,956 | 2/1968 | Reitman et al. | 99—78 |
| 3,016,299 | 1/1962 | Raffensperger et al. | 99—78 |
| 3,152,909 | 10/1964 | Raffensperger et al. | 99—78 |
| 3,009,810 | 11/1961 | Raffensperger et al. | 99—78 |
| 3,459,557 | 8/1969 | Ohashi et al. | 99—78 |

OTHER REFERENCES

Whistler et al., Industrial Gums (1959), pp. 307–309.
Condensed Chemical Dictionary, 7th edition (1966), pp. 80, 791, 792.

JOSEPH SCOVRONEK, Primary Examiner
S. B. DAVIS, Assistant Examiner

U.S. Cl. X.R.
99—166, DIG. 4; 252—363.5